US011989662B2

(12) United States Patent
Skupin et al.

(10) Patent No.: US 11,989,662 B2
(45) Date of Patent: May 21, 2024

(54) METHODS AND SYSTEMS FOR BASE MAP AND INFERENCE MAPPING

(71) Applicant: SAN DIEGO STATE UNIVERSITY RESEARCH FOUNDATION, San Diego, CA (US)

(72) Inventors: André Skupin, San Diego, CA (US); Fangming Du, San Diego, CA (US)

(73) Assignee: San Diego State University Research Foundation, San Diego, CA (US)

( * ) Notice: Subject to any disclaimer, the term of this patent is extended or adjusted under 35 U.S.C. 154(b) by 1368 days.

(21) Appl. No.: 15/502,764

(22) PCT Filed: Oct. 10, 2015

(86) PCT No.: PCT/US2015/055035
§ 371 (c)(1),
(2) Date: Feb. 8, 2017

(87) PCT Pub. No.: WO2016/057984
PCT Pub. Date: Apr. 14, 2016

(65) Prior Publication Data
US 2017/0228654 A1 Aug. 10, 2017

Related U.S. Application Data

(60) Provisional application No. 62/062,326, filed on Oct. 10, 2014.

(51) Int. Cl.
*G06N 3/04* (2023.01)
*G06F 16/22* (2019.01)
(Continued)

(52) U.S. Cl.
CPC ............... *G06N 5/04* (2013.01); *G06F 16/22* (2019.01); *G06F 16/24578* (2019.01);
(Continued)

(58) Field of Classification Search
CPC ...................................................... G06N 3/04
See application file for complete search history.

(56) References Cited

U.S. PATENT DOCUMENTS

2002/0042793 A1   4/2002   Choi
2003/0208485 A1   11/2003  Castellanos
(Continued)

FOREIGN PATENT DOCUMENTS

WO   WO 2010/017159 A1   2/2010

OTHER PUBLICATIONS

Millar, Jeremy R. Gilbert L. Peterson, and Michael J. Mendenhall. "Document Clustering and Visualization with Latent Dirichlet Allocation and Self-Organizing Maps" 2009 [Online] Downloaded Jan. 29, 2021 https://d1wqtxts1xzle7.cloudfront.net/49319774/FLAIRS09-Millar.pdf?1475509764=&response-content-disposit.*
(Continued)

*Primary Examiner* — Ben M Rifkin
(74) *Attorney, Agent, or Firm* — Knobbe, Martens, Olson & Bear, LLP

(57) ABSTRACT

Provided herein are systems and methods for an iterative approach to topic modeling and the use of web mapping technology to implement advanced spatial operators for interactive high-dimensional visualization and inference.

20 Claims, 11 Drawing Sheets

(51) Int. Cl.
*G06F 16/2457* (2019.01)
*G06F 16/29* (2019.01)
*G06F 16/9537* (2019.01)
*G06F 40/103* (2020.01)
*G06N 3/088* (2023.01)
*G06N 5/04* (2023.01)

(52) U.S. Cl.
CPC .......... *G06F 16/29* (2019.01); *G06F 16/9537* (2019.01); *G06F 40/103* (2020.01); *G06N 3/04* (2013.01); *G06N 3/088* (2013.01)

(56) References Cited

U.S. PATENT DOCUMENTS

| | | | |
|---|---|---|---|
| 2008/0140616 A1* | 6/2008 | Encina | G06F 16/31 |
| 2010/0125540 A1* | 5/2010 | Stefik | G06F 16/00 706/12 |
| 2010/0280985 A1 | 11/2010 | Duchon et al. | |
| 2012/0191694 A1* | 7/2012 | Gardiol | G06F 16/313 707/709 |
| 2013/0110838 A1 | 5/2013 | Lidy et al. | |
| 2014/0067829 A1 | 3/2014 | Barney | |
| 2014/0074758 A1 | 3/2014 | Amid et al. | |

OTHER PUBLICATIONS

Bullinaria, John A. "Self Organizing Maps: Fundamentals" 2004 [Online] Downloaded Jan. 29, 2021 https://www.cs.bham.ac.uk/~jxb/NN/l16.pdf (Year: 2004).*

Kaski, Samuel et al. "WEBSOM—SElf-Organizing maps of document collections" 1998 [Online] Downloaded Jan. 29, 2021 https://www.sciencedirect.com/science/article/pii/S0925231298000393 (Year: 1998).*

Vseanto et al. "Self-Organizing Map in Matlab: the SOM Toolbox" 2000 [Online] Downloaded Aug. 13, 2021 http://128.174.199.77/matlab_class/martinez/edatoolbox/Docs/toolbox2paper.pdf (Year: 2000).*

SKupin, Andre. Joseph R. Bilberstine, and Katy Borner. "Visualizing the Topical Structure of the Medical Sciences: a Self-Organizing Map Approach." Mar. 2013 https://journals.plos.org/plosone/article?id=10.1371/journal.pone.0058779 (Year: 2013).*

Skupin, Andre. "A Cartographic Approach to Visualizing Conference Abstracts" 2002 [Online] Downloaded Jan. 4, 2023 https://ieeexplore.ieee.org/stamp/stamp.jsp?tp=&arnumber=974518 (Year: 2002).*

Montain, Jacqueline M. "Integrating Geographic Information Systems and Spatial Analysis into Public Health Applications" 2001 [Online] Downloaded Jan. 22, 2024 http://www.geography.ryerson.ca/wayne/msa/jacquelinemontainmrp2001.pdf (Year: 2001).*

International Search Report & Written Opinion dated Dec. 30, 2015 in PCT/US15/55035, which is related to the present application.

International Preliminary Report on Patentability dated Apr. 20, 2017 in PCT/US15/55035, which is related to the present application.

* cited by examiner

METHODS AND SYSTEMS FOR BASE MAP AND INFERENCE MAPPING

CROSS-REFERENCES TO RELATED APPLICATIONS

The present disclosure claims priority to U.S. Provisional App. No. 62/062,326, entitled "METHODS AND SYSTEMS FOR INTERACTIVE TEXT SPATIALIZATION WITH INFERENCE (ITSI)", filed Oct. 10, 2014, the contents of which is incorporated herein by reference in its entirety.

FIELD

The disclosure relates generally to the field of constructing a base map with interactive inferencing capabilities.

BACKGROUND

Visualization is the process of making a phenomenon visible or enabling the forming of a mental image of it. Through different visualization products, human beings are able to see and thus understand abstract information more efficiently. For example, on a subway map, people can actually see the whole transportation system and understand how to transfer between different lines to get to a destination.

Information visualization is the use of computer-supported, interactive, visual representations of abstract data to amplify cognition. With more and more information available online nowadays through computers and the Internet, it has become much more difficult to understand the huge information or even produce any forms of visualization from it. With computational algorithms, information visualization can represent huge amount of information visually for human beings to better understand them and explore them to create new knowledge. Science is rapidly developing in different disciplines every year with new publications; it has become almost impossible to understand the whole structure of science or even one knowledge domain of it. Principles and techniques of information visualization can be utilized to visualize knowledge domains. Through the analysis of domain artifacts, knowledge visualization can give an overview of a whole discipline and its development from the past to the future, thus further guiding students, educators and practitioners in more fruitful directions.

With respect to visualization, cartography has theories and practices dealing with the visualization of geographic information. Further, spatial metaphors have been used in information visualization in order to utilize humans' spatial cognitive abilities. Spatialization has emerged as a new research frontier and deals with how to display high-dimensional data in a lower-dimensional space. It integrates computational algorithms that deal with dimensionality deduction and spatial concepts and cartographic principles that help design the lower-dimensional display space. Spatialization is applicable to knowledge domain visualization and has the potential to integrate additional cartographic approaches. However, interaction as one of the most important aspects in information visualization cannot be achieved through traditional static cartographic principles and techniques. Although some relatively simple online mapping technologies have been used for non-geographic knowledge domain visualization, such as using Google Maps, these tend to provide only very limited user interaction and functionality and are lacking in the ability to perform text mining and inference, as opposed to mere presentation of stored visualizations.

Meanwhile, more advanced web geographic information system (GIS) solutions are now widely used to provide interactive web mapping applications, but have traditionally focused solely on geographically referenced data. It would be desirable to combine interactive knowledge domain visualization and geographic concepts and text mining techniques to produce an even more comprehensive user experience, including allowing users to perform analytical operations that integrate interactive mapping with text mining and inference involving arbitrary text content and documents.

SUMMARY

There are provided herein systems and methods for an iterative approach to topic modeling and the use of web mapping technology to implement advanced spatial operators for interactive high-dimensional visualization and inference. An embodiment of disclosure provides an integrated workflow and framework to utilize topic modeling, self organizing map (SOM) dimensionality reduction, and web GIS to create interactive knowledge domain visualization from any domain-specific large text corpus and perform analytical operations that relate user-provided text input to a such text corpus and visualized base map.

In a first aspect, a method of constructing a base map is disclosed. The method includes: processing data items to create modified data items; removing stop topics from the modified data items; processing of modified data item to create topic model usable data format to form a topic model; processing the topic model into a self organizing map (SOM) to form a geometric data structure; and providing the geometric data structure into a geographic information system (GIS) to form a base map. In an embodiment of the first aspect, the processing of data to create a topic model usable data format includes: receiving a plurality of text documents; and selecting a portion from each of the plurality of text documents to create a plurality of modified text documents. In an embodiment of the first aspect, the method further includes: converting the modified text documents into a topic model usable format. In an embodiment of the first aspect, the topic model usable format includes a plurality of individual modified text documents as plain text files or a single plain text file including line-separated text content of a plurality of modified text documents. In an embodiment of the first aspect, the method further includes: reformatting the topic model usable format into an ingestible topic model format. In an embodiment of the first aspect, the topic model includes a Latent Dirichlet allocation (LDA) topic model. In an embodiment of the first aspect, the removing of stop topics from the modified data items to form a topic model includes: receiving topic model usable data; and identifying a number of topics to use in the topic model. In an embodiment of the first aspect, the method further includes: determining a topic model output including a plurality of top words and top phrases for each topic. In an embodiment of the first aspect, the topic model output further includes: a list of data items each having weighted values for topic model topics; and a topic model inferencer configured to provide the weighted values for the topic model topics. In an embodiment of the first aspect, the method further includes: identifying stop topics based on top words and top phrases for the topic model topics. In an embodiment of the first aspect, the method further includes:

identifying stop phrases and stop terms based on top terms and top phrases of the identified stop topics; and removing stop phrases and stop terms from the topic model usable data format to form a topic model. In an embodiment of the first aspect, the base map includes a plurality of layered geometric structures, symbolization and labeling. In an embodiment of the first aspect, the layered geometric structures include: SOM neurons structured as polygons and point centroids of those polygons, with associated attributes including topic weights for all topics, row-normalized weights for all topics, and rank order of each topic based on the row-normalized weights; raster structure as interpolated from row-normalized topic weights for all neurons; or clusters of SOM neurons as polygon features, with different clustering solutions represented in separate polygon layers. In an embodiment of the first aspect, the symbolization includes: contour line symbolization and hill shading of an interpolated raster structure; or delineation and coloring of boundaries of neuron clusters, or coloring of cluster areas. In an embodiment of the first aspect, the labeling includes: within a cluster layer, top words and phrases of the highest ranked topics for each cluster being used as label text and placed such that the shape and extent of each cluster in the two-dimensional space is approximated; and for a separate polygon layer representing a cluster solution, a separate label layer is generated and is displayed within specified zoom levels. In an embodiment of the first aspect, removing stop topics from the modified data items to be processed to form a topic model includes an automated or manual iterative loop. In an embodiment of the first aspect, the automated iterative loop includes comparing stop topics to a stored library of stop topics. In an embodiment of the first aspect, the method further includes: providing a query text; receiving an inference and mapping the inference onto the base map based on the similarity of an inferred query topic vector to SOM neuron topic vectors; and storing the query text and the inferred query topic vector. In an embodiment of the first aspect, the query topic vector is determined as the weighted distribution of topic model topics for the query text. In an embodiment of the first aspect, the method further includes: providing a discrete overlay or continuous overlay onto the base map to form an inference layer. In an embodiment of the first aspect, the method further includes: storing the inference layer as a new base map.

In a second aspect, a system is disclosed. The system includes: a data store configured to store data; a computer-readable tangible medium including software instructions; and a processor configured to access the computer-readable tangible medium to load and execute the software instructions to: process data items from the data store to create modified data items; remove stop topics from the modified data items; process modified data items into a topic model usable data format to form a topic model; process the topic model into a self organizing map (SOM) to form a geometric data structure; and provide the geometric data structure into a geographic information system (GIS) to form a base map.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

The creation of base maps using vector space model (VSM) and self-organizing maps (SOMs) is known. In that spatialization approach, the VSM includes vectors containing term counts for each document. VSM then undergoes dimensionality reduction using SOM. However, there are certain drawbacks to this use of traditional VSM:

Scalability. Large document collections will result in vectors whose high dimensionality may make SOM training more difficult.

Sparseness. Vectors in the VSM tend to be very sparse, since any particular document vector will record a count of zero for most terms.

Term order. The order in which the term appears in the documents is lost in the vector representation, at least when using unigram counts. While use of multi-part n-grams would be possible, that can increase the already high dimensionality of the VSM even further.

Semantic sensitivity. Documents with related content, but differences in actual vocabulary (e.g., synonyms), might not display sufficiently strong similarity.

Stemming effects. Though stemming of the original terms will lower the model dimensionality, it may result in "false positive matches" for stems that originate from terms with significantly different meaning.

An embodiment of this disclosure replaces the VSM approach with a topic model (TM) approach, prior to SOM training. TM is a new type of statistical model for discovering abstract topics from document corpus. Given that one document is about a particular topic, one would expect that the particular words describing that topic would appear in that document more frequently. Latent Dirichlet allocation (LDA) is the most common topic model currently in use. In LDA, one topic is defined as a distribution over a fixed vocabulary and each document is a mixture of topics with different proportion. It allows one document to have a mixture of topics. Thus topic models treat each document as a mixture of topics derived from a collection of documents. Whereas in canonical user of a topic model approach only those topics are of interest for a given document that have elevated loadings for the document, in the present disclosure loadings for all topics are generated and stored for all documents. This gives rise to a high-dimensional space whose dimensionality corresponds to the number of topics and in which all documents are located by virtue of having loadings for all topics.

In some embodiments, high dimensional topics are extracted from the text corpus. Topics extracted from the text corpus represent dimensions of a high-dimensional topical space. Representation for different topics and sub-domains are filtered to be meaningful, in the context of knowledge domains. The SOM transfers this high-dimensional topical space to a two-dimensional space that can be used for creating visual depictions, e.g. maps.

Figure 1:
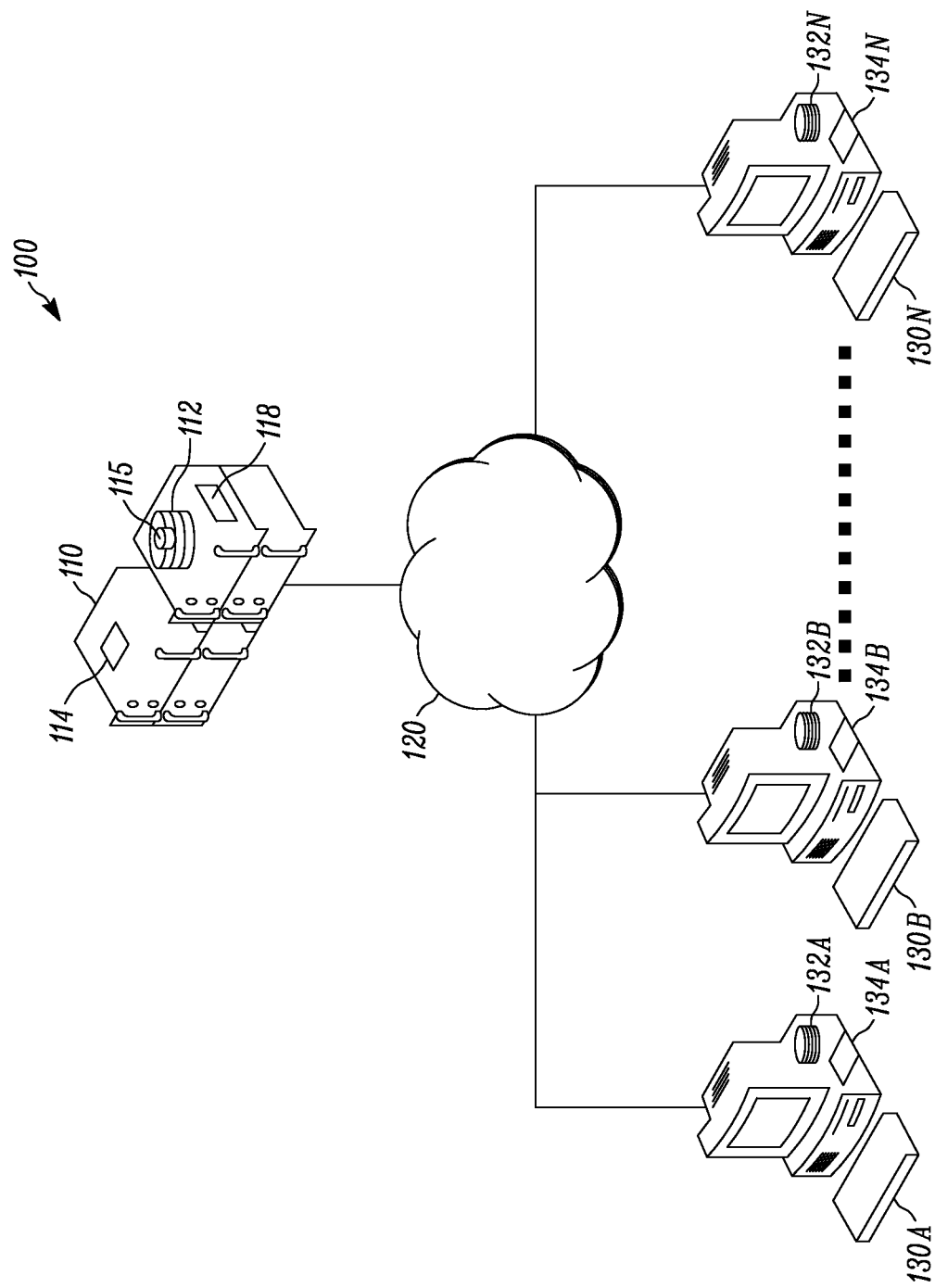
FIG. 1 illustrates an example networked computer system in accordance with an embodiment of the present disclosure.

A system for implementing procedures in accordance with the present disclosure is provided. In FIG. 1, there is illustrated a networked computer system, generally designated as 100, in accordance with an embodiment of the disclosure. The computer system 100 includes a server 110 connected to a plurality of client computer systems 130A, 130B, ..., 130N connected to the server 110 via a network 120. The server 110 includes a computer-readable medium 112 and a processor 114. The client computer system 130A includes a computer-readable medium 132A and a processor 134A. The client computer system 130B includes a computer-readable medium 132B and a processor 134B. The client computer system 130N includes a computer-readable medium 132N and a processor 134N.

In some embodiments, the system 100 further includes a data store 115 for storing data. System 100 further includes a topic inferencer or topic inferencing module 118. Topic inferencing module 118 may be configured to perform inferencing that generates for any text input a vector of topic weights that expresses the degree to which each of a plurality (e.g., hundreds or thousands) of topics relates to the input text. Such inferred topic vector is further used to map the input vector onto a base map as either a discrete or a continuous feature. The network 120 may be the Internet, a local-area network, a wide-area network, or any kind of computer network.

It is to be understood that the computer-readable medium 112 and the external computer-readable medium may be any tangible computer readable medium on which data may be stored, such as a computer hard drive, an optical medium (e.g., an optical disc), a solid-state memory (e.g., flash memory), and other storage media known in the art.

The client computer systems 130 may be any kind of computing device, such as a personal computer, a laptop computer, a tablet computer, a smart phone, etc. It is to be understood that the client computer system 130 need not be the same kind of computing device. The client computer system 130A may be a personal computer, the client computer system 130B may be a tablet computer, and the client computer system 130C may be a smart phone.

The server 110 may be a web server that hosts a plurality of web application. Each web application is accessible by a respective one of the client computer system 130 over the Internet 120. Each of the client computer systems 130 may execute a client application that interacts with the web application hosted by the server 110. In an exemplary embodiment, the client application may be a web browser that provides a client-side interface to any of the web applications hosted by the server 110. Access to one of the plurality of web applications is determined by the user of the system 100.

In order to use a system, such as shown in FIG. 1, data taken in from e.g., text corpus may be to be preprocessed into a suitable or compatible data feed for the system.

Preprocessing Data for Topic Model

In order to feed the data into a TM, it is desirable to preprocess it into a TM usable format. As an example, a dataset used may include of 66,000 conference abstracts collected from the annual meetings of a professional organization in various formats over the course of 20 years, such as shown in Table 1. Such preprocessing is shown in FIG. 2.

TABLE 1

| Dataset Format | |
|---|---|
| Year | Format |
| 1993-2002 | XML |
| 2003 | PDF |
| 2004 | XML |
| 2005-2012 | Excel |

Figure 2:
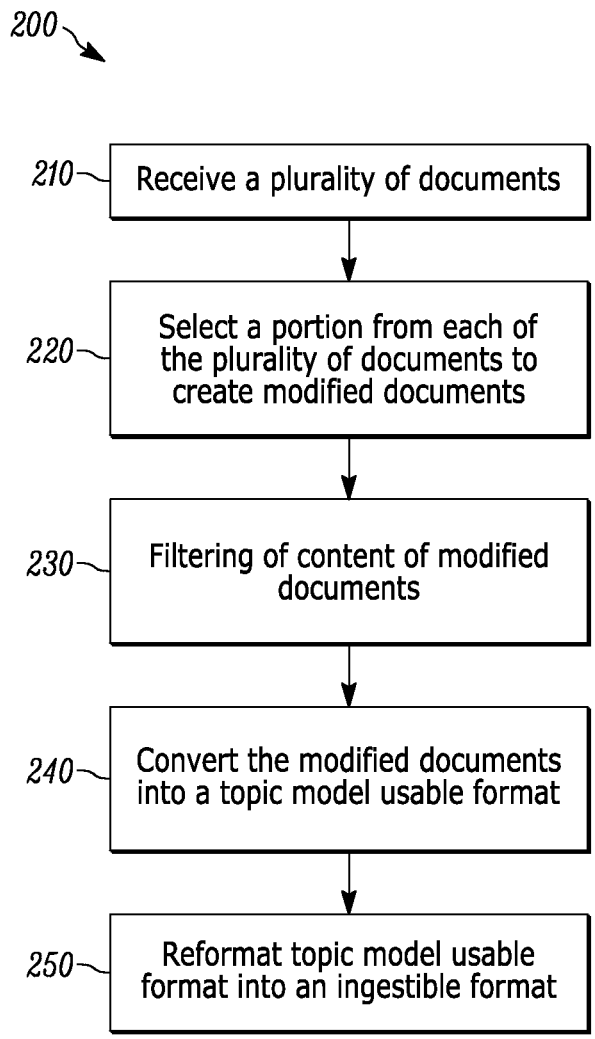
FIG. 2 illustrates an example procedure for preprocessing data to input into a topic model in accordance with an embodiment of the disclosure.

FIG. 2 illustrates an example procedure 200 for preprocessing data to input into a topic model n accordance with an embodiment of the disclosure. At operation 210, a plurality of documents each relating to a plurality of topics are received. At operation 220, a portion from each of the plurality of documents is selected and processed to create a plurality of modified documents. Modified documents may include entire source documents or of individual segments extracted from the source documents, such as chapters, sections, sub-sections, paragraphs, or sentences. As an example, a source document having five sections and twenty paragraphs may alternatively be processed into a single modified document or five or twenty modified documents. The portions selected may include important or pre-designated information such as title, abstract, full text, author, key words or any metadata associated with the documents.

At operation 230, the content of the modified documents is filtered. At operation 240, the modified documents are converted into a topic model usable format. The topic model usable format is any format that is a topic model friendly or suitable single format. Such formats include semi-structured and structured formats and unstructured text.

For example, processing data into one single XML schema allows the data to be easily transformed to any other format. Documents in PDF format may be first exported to text (TXT) format, which contains three lines. The first line includes author name, author contact info and abstract title; the second includes abstract content; and the third includes abstract keywords. This text file may be converted to an XML format in Java. There are three elements for three lines. Paper title, author name and author contact information may be extracted from the first element.

Documents in Excel format may be exported to two XMLs with author and abstract information, which are then joined together to a single XML file in Java. Each XML file, which was derived from the dataset of documents of varying formats, may be fed information about its corresponding abstract, including paper year, conference location and ID. Information about the abstract, ID, title, keywords, abstract text and author info, may be included in each abstract. Author information includes name, author ID, and other information.

At operation 250, the topic model usable format is reformatted into a TM ingestible format. For example, the XML file can be transformed to an e.g., Mallet input format (each line contains one input document with ID and text content) for training of topic models.

Additionally, in some embodiments, the topic model may be set to a case-sensitive mode in order to detect capital characters. In such embodiments, all capital characters need to be transformed to lower case in terms both containing only capital characters and those in which the first character is a capital character. Also, each noun may be transformed to its singular form, as the same noun in plural and singular form would be treated as different words in topic model.

LDA Topic Modeling

In some embodiments, there are two preprocessing parts in LDA topic modeling. Firstly, irrelevant text is filtered out from the original corpus to ensure the quality, expressiveness, and relevance of the output topics. Secondly, it uses number of topics as input parameter for the training, which also influences the quality of the output topics.

As the LDA topic model intuitively discovers "topics", some of these may be of a syntactic or procedural nature instead of being domain-specific semantic descriptors. For example, one of the topics initially generated by a model was characterized by phrases like "paper examines," "paper explores," "paper concludes," or "paper discusses". These are not particularly relevant in the discovery of domain knowledge structures since they are general expressions that could appear in any source document. To make this distinction, the notion of a stop topic is introduced, which can be removed from the original text corpus before further analysis. Since each topic extracted from the text corpus through a topic model is characterized by the appearance of particular words and phrases in the input files, the removal of a stop topic from the text corpus can take the form of a removal of specific stop words and stop phrases from the text corpus, e.g., removal of those words and phrases associated with a stop topic. Optionally, only stop phrases can be removed, leaving in place individual words associated with stop topics, since these words may be used in different contexts in non-stop topics.

Among generic stop phrases, two types are distinguished. The first type of stop phrase is a phrase that pairs certain generic nouns (e.g., "challenge", "difficulty", "issue", "problem", "paper", "project", "research", "study") with a verb (e.g., "study explores" or "challenges met"). The second type of stop phrase is a phrase that includes a commonly used adverb (e.g., "widely", "generally", "commonly", "broadly", "basically", "fully", or "typically") in combination with a past participle verb (e.g., "fully accepted" or "typically discussed"). These can be accessed from a file or database of such stop phrases or automatically identified by the use of part-of-speech tagging, which determines the specific grammatical role of each word token in a phrase.

Furthermore, there are general stop words, such as "I" or "is", or domain-specific stop words/phrases, which could be filtered from a text corpus. The user can take some effort to identify domain-specific stop words/phrases prior to filtering. In some embodiments, several iterative rounds of filtering may be performed to remove stop words, stop topics, and stop phrases from the text corpus.

When filtering the text corpus data, the number of topics for topic modeling, can be determined. Perplexity is widely used in natural language processing to evaluate the performance of language processing models. The perplexity of topic models with different input topic numbers can be computed to evaluate them.

Figure 3:
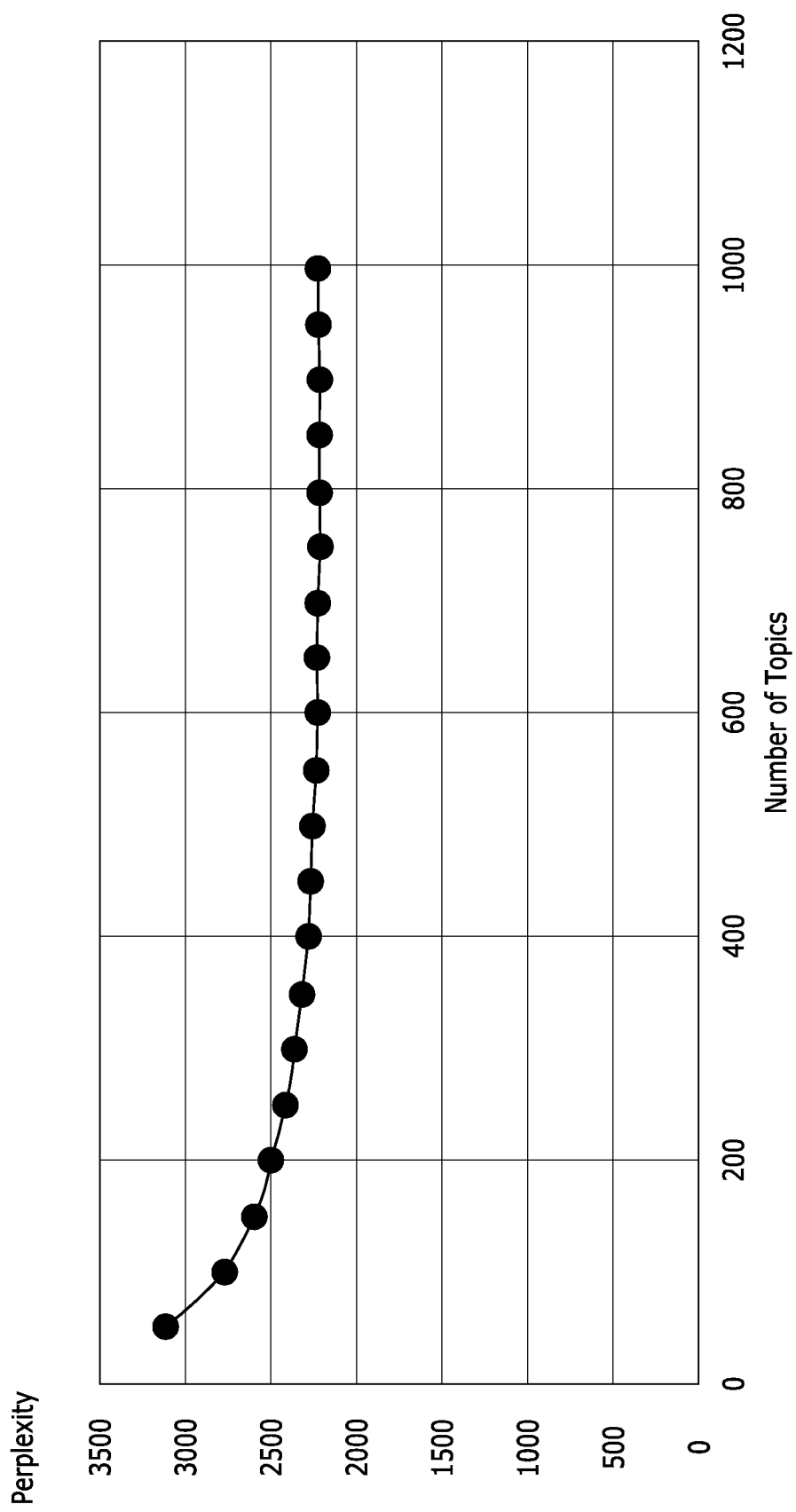
FIG. 3 illustrates an example perplexity graph showing a number of topics in accordance with an embodiment of the disclosure.

The data set input into the topic model can be split into a training set and a test held-out set. The training dataset is trained with a different number of topics and is evaluated against all the test held-out datasets to get the log likelihood of each document. Perplexity for the LDA topic model may then be computed based on the length of each document to produce a perplexity graph (FIG. 3). As shown in FIG. 3, four hundred to six hundred topics would be a good range for the example model, because that is where the model seems to only incrementally change and models with a lower perplexity score, in general, have a better performance.

Once the dataset has been preprocessed, it can then be used to compute an LDA topic model. Generally, there are two steps in topic training. The first step is importing the data into a preprocessed data object, where preprocessing involves recording of tokens and token sequences, removal of general stop words, and upper/lower case manipulation. For example, when using the Mallet library, the "keep sequence" option preserves information about sequences of word tokens encountered in documents, instead of only accounting for individual words, while the "preserve case" option preserves terms containing upper case characters in the model so that some domain terms, e.g., GIS, would be preserved during the topic model training. The "remove stopwords" option removes stop words from a user-defined list such as default stop words lists for English or other languages.

Preprocessed data objects are then used in the training of a topic model. In some embodiments, a required input parameter is the number of topics. Sample output files are shown in Table 2.

TABLE 2

LDA Topic Model Training Output Files

| File Name | File Description | Example | | | | |
|---|---|---|---|---|---|---|
| doc-topics | Topic composition of documents | #doc name topic proportion . . . | | | | |
| | | 0 | 1199300001 | 259 | 0.05436241610738255 | 204 |
| | | 1 | 1199300002 | 277 | 0.1360902255639098 | 397 |
| | | 2 | 1199300003 | 149 | 0.15235602094240838 | 307 |
| | | 27906 | 1200500001 | 248 | 0.2914529914529915 | 143 |
| | | 27907 | 1200500002 | 139 | 0.12312925170068029 | 470 |
| | | 27909 | 1200500004 | 255 | 0.19271523178807948 | 390 |
| | | 27921 | 1200500016 | 459 | 0.10255102040816327 | 493 |
| | | Here column one is the document id, column two is the document name, and all the other columns come in pairs with topic id and topic weight. Each row is one input document. | | | | |

TABLE 2-continued

LDA Topic Model Training Output Files

| File Name | File Description | Example |
|---|---|---|
| topic-keys | Top k words for each topic | 240 0.1 narrative space place imaginary |
| | | 241 0.1 weather forecast data forecasting |
| | | 242 0.1 behaviour lifestyle active |
| | | 243 0.1 poverty inequality income poor |
| | | 244 0.1 function functional Jersey |
| | | 245 0.1 dam removal reservoir canal Dam |
| | | 246 0.1 channel stream river fluvial |
| | | 247 0.1 air pollution ozone concentration |
| | | 248 0.1 geospatial data standard ontology |
| | | 249 0.1 operation dairy number milk |
| | | 250 0.1 chain commodity production |
| | | 251 0.1 mountain Mountains Mountain |
| | | Column one is the topic id, column two is the Dirichlet parameter, and column three contains the top words that characterize this topic. Each row is one topic. |
| xml-topic-phrase | Top k words and phrases for each topic with counts. | <topic id="248" alpha="0.1" totalTokens="18092" titles="<br>   <word weight="0.07920627901835066" count="1433">geospatial</word><br>   <word weight="0.0670462082688481" count="1213">data</word><br>   <word weight="0.042173336281229275" count="763">standard</word><br>   <word weight="0.03636966615078488" count="658">ontology</word><br>   <word weight="0.024099049303559585" count="436">information</word><br>   <word weight="0.021114304665045325" count="382">semantic</word><br>   <word weight="0.02034048198098607" count="368">metadata</word><br>   <word weight="0.014315719655096175" count="259">Geospatial</word><br>   <phrase weight="0.04777590007347538 6" count="65">geospatial data</phrase><br>   <phrase weight="0.024245877296105803" count="33">metadata standard</phrase><br>   <phrase weight="0.02351212343864805" count="32">semantic interoperability</phrase><br>   <phrase weight="0.02204261572373255" count="30">Semantic Web<phrase><br>   <phrase weight="0.019103600293901544" count="26">geospatial information</phrase><br>   <phrase weight="0.00881704628949302" count="12">data standard</phrase><br>   <phrase weight="0.00881704628949302" count="12">geospatial technology</phrase><br>   <phrase weight="0.0073475385745775165" count="10">semantic web</phrase><br>This is an XML file. For each entry, it describes top words, phrases and counts for one topic. |
| inferencer | Inferencer tool based on trained model. It can be used to get topic proportions for new documents. | This is a binary file. The usage is to get the topic proportion for new documents associated with trained model. For our application, users can type any text and this text can then be inferred based on trained model to get its topic scores. |
| evaluator | It can be used to estimate the log probability of new documents. | This is a binary file. The log probability computed by this evaluator file can be used to compute the perplexity parameter (this is discussed in the following section). |

Referring to Table 2, the processing model has analyzed sample document "1200500001" (the first document from year 2005 in this sample corpus), and gave the highest weight to topic 248, which is characterized by use of the words "geospatial", "data", and "ontology", and the phrases "geospatial data," and "semantic web." The content of 1200500001 speaks about "semantic" and "geospatial web", confirming that LDA topic model has successfully extracted the topical features of the input document.

Figure 4:
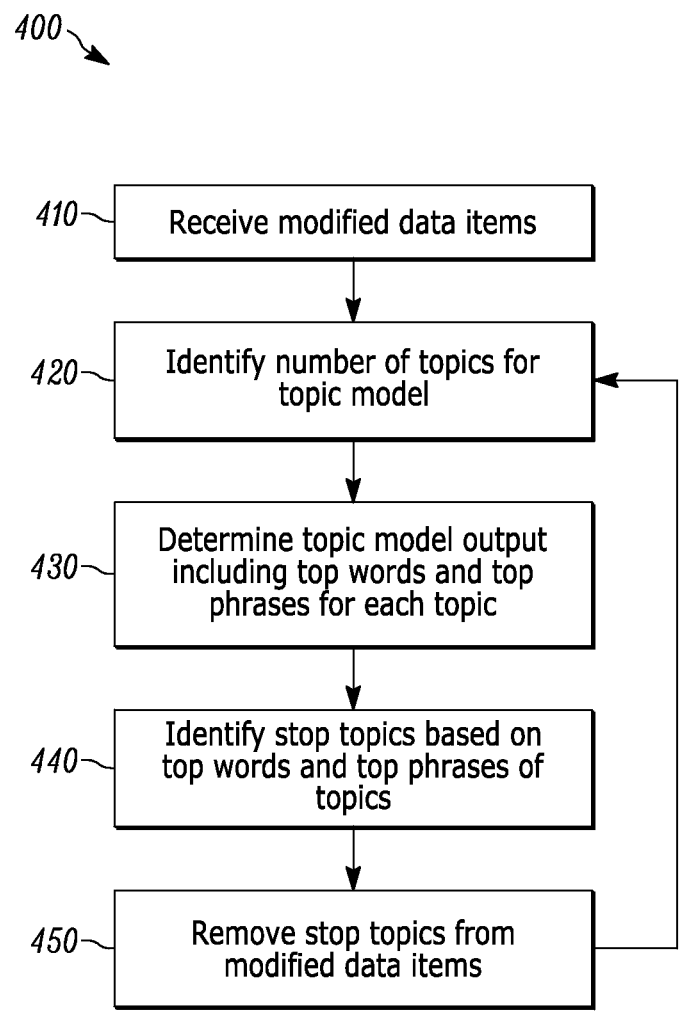
FIG. 4 illustrates an example procedure for removing stop topics from a topic model in accordance with an embodiment of the disclosure.

FIG. 4 illustrates an example procedure 400 for removing stop topics from a topic model in accordance with an embodiment of the disclosure. At operation 410, topic model usable data or data items are received, as described above with respect to FIG. 2. At operation 420, the number of topics to be used in the topic model is identified, as described above with respect to FIG. 3. In some embodiments, the topics identified are referred to as latent topics, defined herein as clusters of words and phrases that co-occur with certain probabilities across a corpus. For example, "channel," "stream," "river," "fluvial" are words associated with a latent topic one may refer to as "hydrology."

In some embodiments, after the number of topics is identified, the topic model generates outputs as seen in Table 2. Operation 430 shows the topic model output being determined. Among others, the output may include a list of documents with a weight of each topic for each document, a list of the top words or phrases associated with each topic, and a topic inferencer configured to allow determining a weight for each topic for any text input or document at a later time.

At operation 440, the stop topics are identified based on the top terms or words and/or top phrases associated with topics. At operation 450 the stop topics are removed from the topic model usable data, by removing either stop phrases or stop words or both. Once operation 450 is complete, the operations 420, 430, 440 and 440 may be repeated as part of an iterative feedback loop to filter out stop topics.

In some embodiments, stop phrases and/or stop words are additionally filtered out of the topic model usable data (e.g. original text) in a process similar to procedure 400. The stop topics, stop phrases and/or stop words may be collected and saved in a library or database. In some embodiments, the library of stop topics, stop phrases and/or stop words may be used as a model to remove additional stop topics, stop phrases and/or stop words.

The removing of stop topics by virtue of removing of stop phrases and/or stop words from the topic model usable data format may be achieved through an automated or manual iterative loop. For example, the process may be automated by comparing the topics to a saved library of stop topics. Alternatively, the process may be automated by identifying diffused topics as stop topics. Such identification exploits the fact that some stop topics and their constituent words and phrases are lacking strong association with only a subset of the documents and are instead distributed (or diffused) across the documents more evenly. That lack of concentration can be determined by computing how dispersed the loadings for each topic are across all documents. If the creation of the topic model is followed by dimensionality reduction using the self-organizing map (SOM) method, than an alternative or additional identification of stop topics can occur by examining the spatial pattern formed by each topic as a component plane in the SOM, e.g. how the topic weights are distributed across the lattice of neurons. This can occur either by visual examination of the pattern and identifying topics that show highly dispersed patterns or by computation of standard measures of spatial autocorrelation and clustering, such as the Moran's I measure. In some embodiments, the iterative loop is performed a few times, such as three or four times. The user may be able to adjust the number of times the iterative loop is run, as it may depend on the number of identified topics, the diversity of documents, etc.

Once the procedure 400 is complete, the user will have a modified topic model representative of meaningful content. Such topic model may then be used as input into a dimensionality reduction technique, for example the self-organizing map (SOM) method, and as input for inference overlay and analysis.

SOM Training and Clustering

In some embodiments, the topic composition output file ("doc-topics" file in Table 2) can be used as input for SOM training. Each document, with its topic scores over all the topics, would be one input for training SOM. The training process iteratively changes the neuron weights and preserves the high-dimensional topic relations from the LDA topic model in a lower-dimensional space that, for purposes of visualization, typically is two-dimensional. Topological relations may be preserved such that closer relations in topical space are represented as being neurons that are geometrically and topologically closer in the low-dimensional neuron lattice. In order to enable later visualization, inference, and analysis, an output of the SOM training process is a list of all neuron vectors, e.g. a list of weights of each topic for each neuron. Secondly, an output can be generated that includes, for each neuron, a value-ordered list of processed topic weights. For example, a topic weight may be processed into a topic dominance value by dividing it by the sum of all topic weights for the neuron. In the context of visualizing knowledge domains, the resulting different ranks of topic weights or topic dominance values at one neuron represent different levels of sub-topics occurring within the domain. These ranked weights can also be the basis for a clustering of neurons, as neighboring neurons can be clustered together if they have the same dominant term at a particular topic dominance rank. In some embodiments, the sum of weights for a user-specified subset of the highest-ranked topics for each neuron is divided by the sum of all topic weights for the neuron. This multi-topic dominance value is stored for later visualization.

The entire workflow may be integrated together in one programming environment (e.g., in Processing, Java, or JavaScript), which can easily be used and extended. For example, a topic-modeling library like Mallet and a SOM training library like SOMatic are both Java-based libraries and can be integrated together in Processing or a Java development environment.

Figure 5:
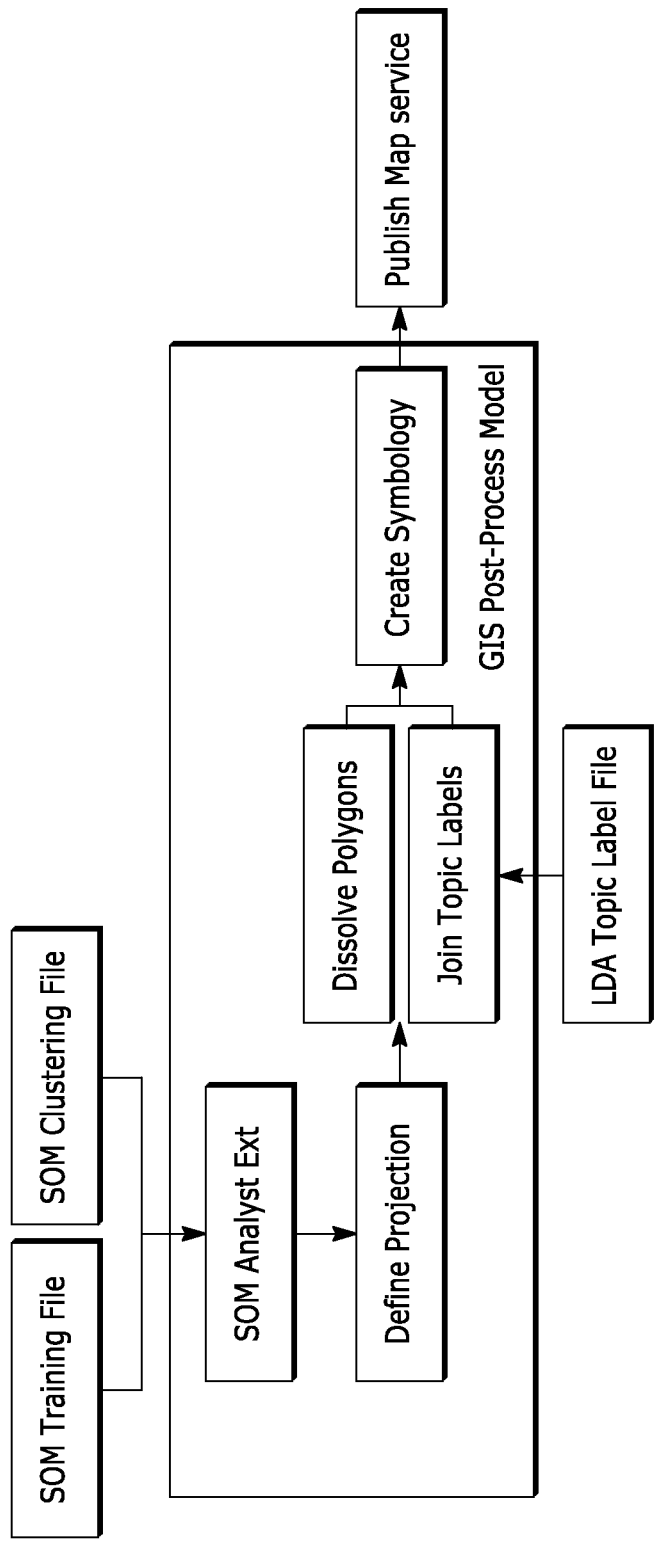
FIG. 5 illustrates an example topic and SOM training workflow in accordance with an embodiment of the disclosure.

The second part of the workflow creates a base map using the output files from the topic and SOM training, such as shown in FIG. 5. This includes transforming output files into vector data that contain geometric and attribute data and are stored in a file or a database. As an example, SOM Analyst is an ArcGIS toolbox that provides the function to convert a SOM training output file to the shapefile format. Each neuron of the SOM is represented as a hexagon or square in the shapefile and has the weights for all topical dimensions as attributes. With the ranked topics file created after SOM training as input, the borders between adjacent SOM neurons in the base map geometric space can be dissolved to form larger polygons as clusters of neurons. At a given topic rank level, each clustered polygon represents one area that all the neurons inside have the same weight in that level. And each such polygon can be labeled with the top ranking topic word or phrase from the topic label file. For a given topic rank level (e.g., rank 1 or rank 2), the corresponding cluster polygons can be stored as a cluster layer for visualization. In accordance with all neurons have an associated ranked list of topics, different levels of SOM neuron layers can be generated with different polygons with different labels, providing semantic zooming in the map, starting from top-level topics down to lower-level topics in that knowledge domain. The user can create a base map combined with different levels of labels and a base layer that represents the value of each neuron.

Figure 6:
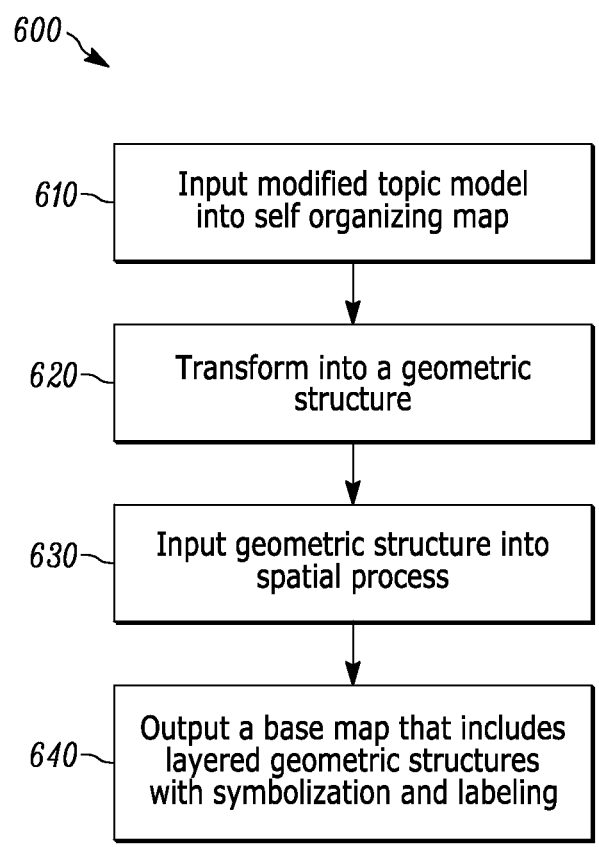
FIG. 6 illustrates an example procedure for generating a base map in accordance with an embodiment of the disclosure.
Figure 7:
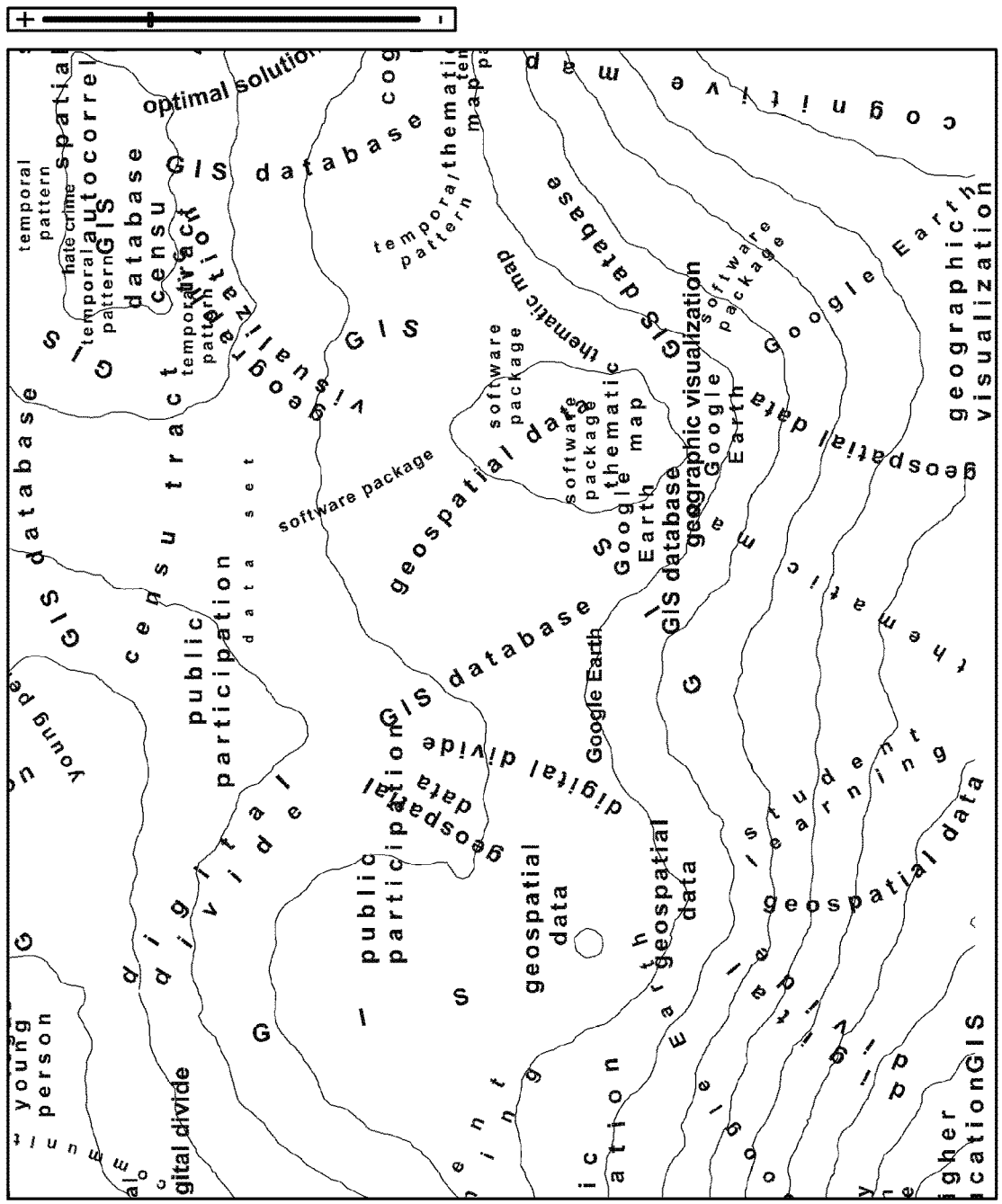
FIG. 7 illustrates an example user interface of a base map in accordance with an embodiment of the disclosure.
Figure 7:
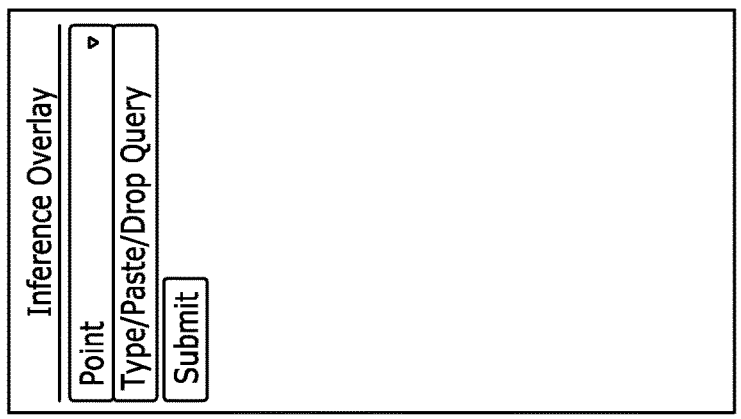
Figure 7:
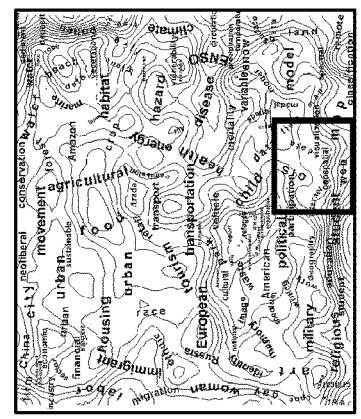

FIG. 6 illustrates an example procedure 600 for generating a base map in accordance with an embodiment of the disclosure. At operation 610, the modified topic model, as described above with respect to FIG. 4, is input into an SOM. The output of the SOM may be a text file, which can be post-processed into a geometric structure and an attribute structure at operation 620. At operation 630 the geometric structure is input into a spatial process (e.g. GIS software). At operation 640, a base map is output that includes layered geometric structures with symbolization (e.g., color, contour lines, etc.) and labeling some embodiments, the labels in the base map correspond to top words or phrases from the topic model. In some embodiments, the base map includes scale dependence, such that the appearance of particular symbolized layers and labels is depending on the zoom level of the map. To the base map there may be added continuous landscape layers spanning the neuron lattice. For example, landscape layers may depict component planes, e.g. the distribution of weights of one topics FIG. 7 illustrates an example user interface of a base map in accordance with an embodiment of the disclosure. Shown here are some user interface elements for performing zooming with level-of-detail-control and extent overview.

Integrating Workflow with Web GIS

The disclosure described so far provides the means to transform text content into base maps. With the technology from Web mapping and web services, the output files and base map created in the workflow can be served on the Internet to provide interactive exploration of the domains.

In some embodiments, web and geo-processing services utilize the computing resources on the servers and provide access to users through networks to execute computing extensive jobs on the fly. Text inferencing and SOM inferencing web services infer for any new text a vector of topic weights and project it into the 2-dimensional space. Thereafter "geo-processing" services and mapping services can display the base map and the projected data from topical space in the web browser. The user can explore the knowledge domain map and project any new text input onto it in a web browser. The web inferencing data and process flow is described in FIG. 8.

Figure 8:
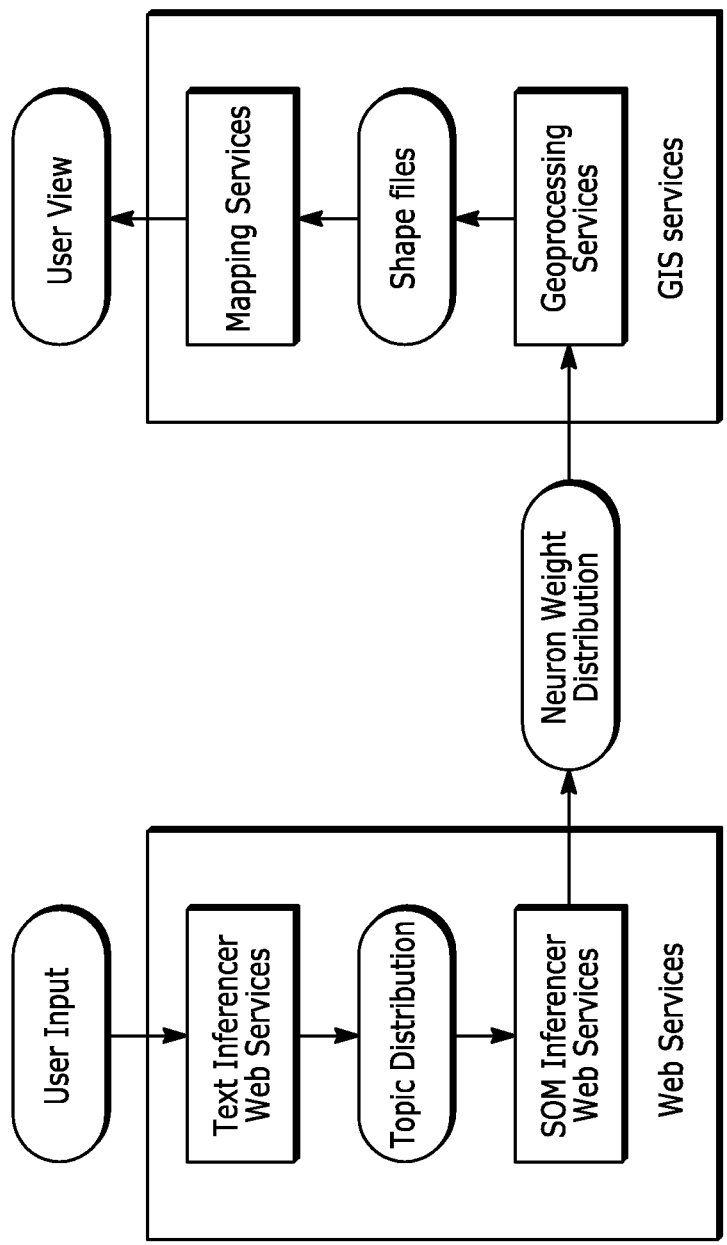
FIG. 8 illustrates an example web inferencing data and process flow in accordance with an embodiment of the disclosure.

This flow in FIG. 8 can be implemented in any programming environment and servers that support the process and data format. As an example, the web inferencing services are implemented in Java and deployed in Glassfish server, the geo-processing and mapping services are implemented in Python with ArcGIS toolboxes and deployed in ArcGIS Server.

Web Inferencing Services

For any new input text presented to the system, its topic loadings can be inferred via the inferencer file generated by the topic model. This topic loadings or mixture represents in vector form how related the input text is to all the domain topics. Next, the relationship between the topic loadings encountered in the new text and the topic weights vectors of all the SOM neurons is computed using a similarity measure (e.g., cosine similarity). That is the basis for projecting the new text onto the SOM-based map, either at one particular neuron or as a continuous field over all neurons.

Figure 9:
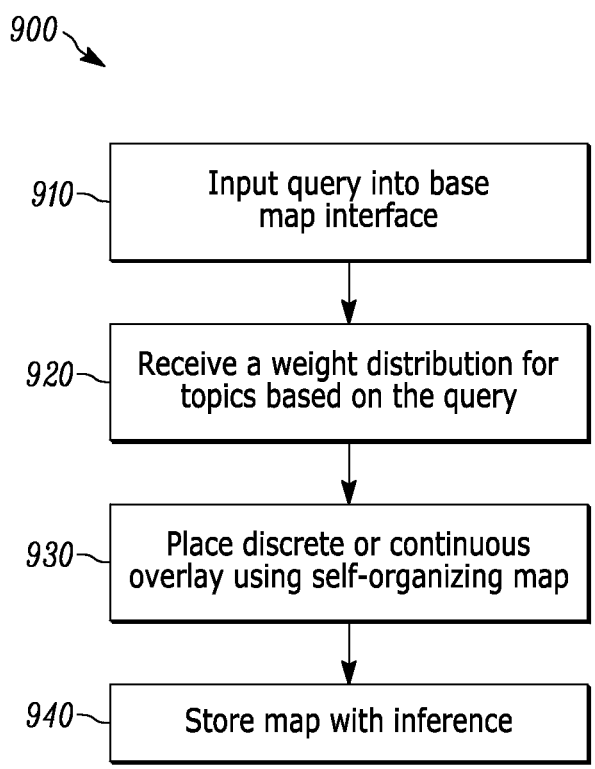
FIG. 9 illustrates an example procedure for generating a query on a base map in accordance with an embodiment of the disclosure.

These two services provide the capability for mapping any new text input or query onto the base map of the knowledge domain. FIG. 9 illustrates an example procedure 900 for generating a query on a base map in accordance with an embodiment of the disclosure. At operation 910, a user inputs a query into the base map interface. Thereafter, the topic inference infers what the weights are for each topic for the query. Operation 920 shows the query receiving a weight distribution, e.g. a vector of weights, for the topics based on the query. At operation 930, a discrete or continuous (e.g. distributed location) overlay is placed on the base map using a SOM. The discrete or continuous overlay is generally placed based on the similarities of input text to neurons, as described above. At operation 940, the map with the inference is stored. The inference may be stored on the base map as a modified map layer (e.g., file). In some embodiments, the text query, the topic weights vector for the query, the vector of similarities between the query and all neurons, and the inferred map layer are automatically pushed to a cloud server for storage and analysis.

In some embodiments, the inferencing services are implemented in Java with REST (Representational State Transfer) web services. REST web services use a specific URL to represent a resource. The user can request the different web services on the server with different defined URLs. For example, the following URL would prompt the server to obtain topic scores for the input text "data analysis": http://192.168.1.1/Text_Inference/getTopicScores?myText=data analysis.

The "getTopicScores" function on the server will process the requested input text and return a result back to the user. The projection functionality performs inference on the input text to generate either a point feature or an overlay surface, driven by the two web inferencing services having first inferred topic loadings and then topic vector similarity to SOM neurons. For the discrete projection, it returns the most similar SOM cell for the new text; and for the continuous overlay surface, it returns the similarity between all SOM cells and the new text.

Figure 10:
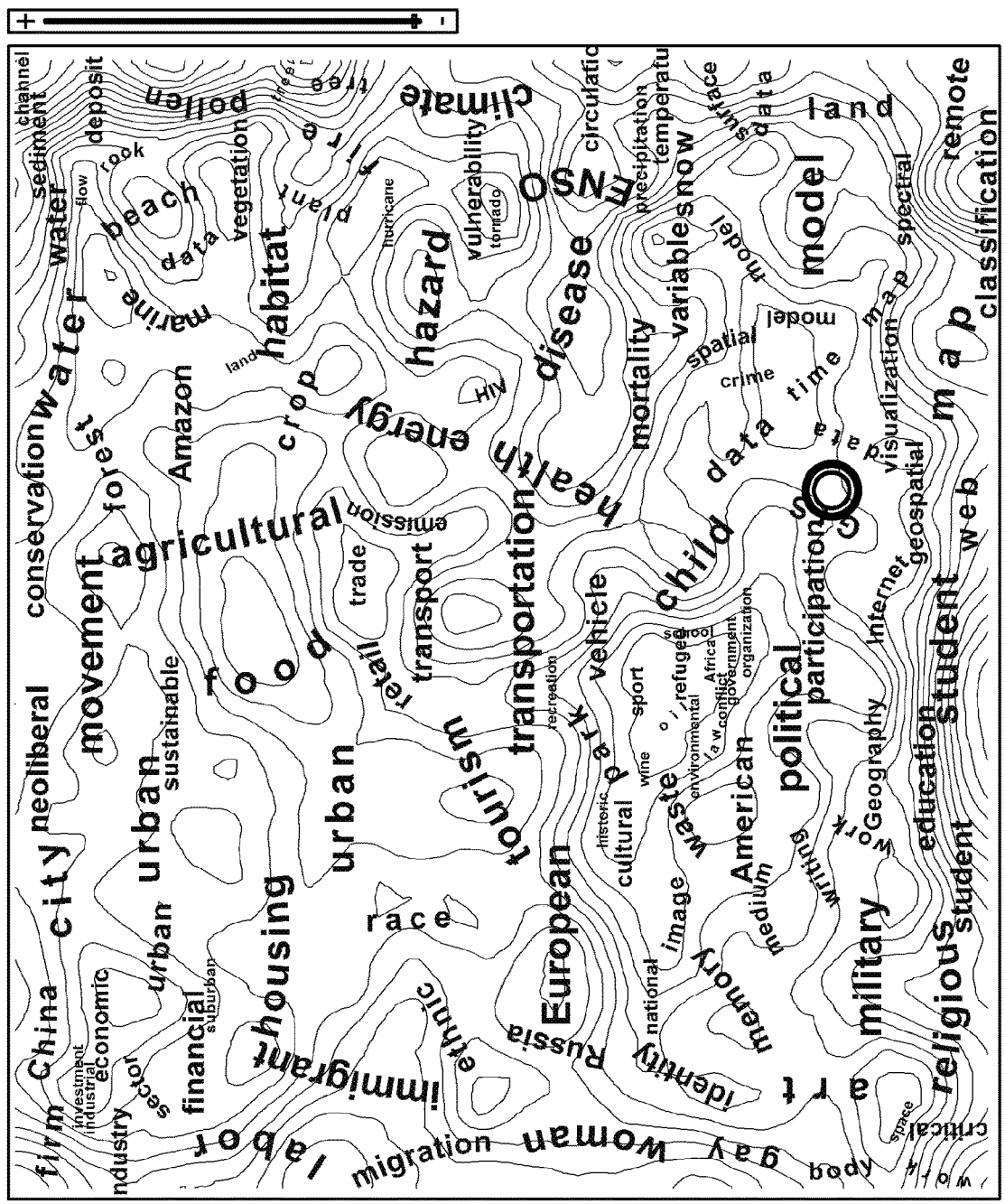
FIG. 10 illustrates an example discrete inference overlay on a base map in accordance with an embodiment of the disclosure.
Figure 10:
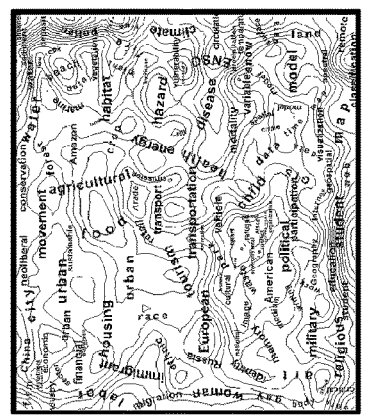
Figure 11:
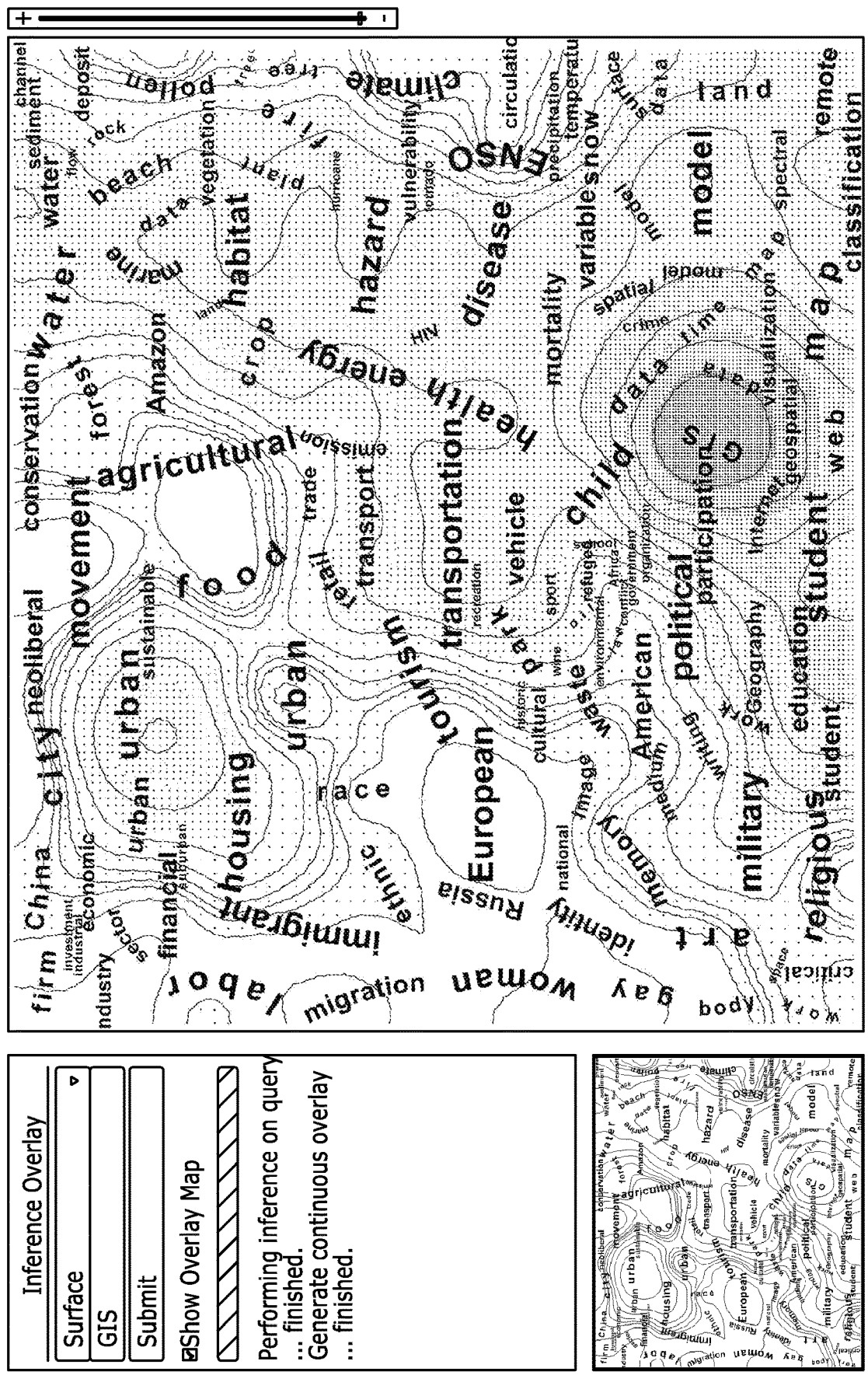
FIG. 11 illustrates an example continuous inference overlay on a base map in accordance with an embodiment of the disclosure.

FIG. 10 illustrates an example discrete (e.g., point feature) inference overlay on a base map in accordance with an embodiment of the disclosure. FIG. 11 illustrates an example continuous inference overlay on a base map in accordance with an embodiment of the disclosure. The shading on the map illustrates the distribution of topic similarity for the query.

Table 3 provides the input and output data for an example inferencing query.

TABLE 3

Input and Output Data for Inferencing Services

| Name | Data | Description |
| --- | --- | --- |
| Input text | A series of maps were produced that together form a type of atlas of the Nokia Mobile Data Challenge (MDC). Like in a traditional geographic atlas, a limited number of base map configurations are generated, onto which various thematic elements are then overlaid. * | This is the input text for the inferencing services. |
| Topic loadings | 0.0, 0.0, 0.054545454545454564, 0.0, 0.018181818181818184, 0.0, 0.0, 0.0, 0.0, 0.0, 0.0, 0.0, 0.0, 0.0, 0.0, 0.0, 0.0, 0.0, 0.12727272727272723, 0.018181818181818188, 0.0, 0.0, 0.0, 0.0, 0.0, 0.018181818181818188, 0.0, 0.0, 0.0, 0.0, 0.0, 0.0, 0.0, 0.0, 0.0, 0.0, 0.03636363636363637, 0.0, 0,0, 0.0, 0.0, 0.0, 0.018181818181818188, 0.0, 0 . . . (It has six hundred topics in our model, so it has six hundred numbers like this.) | This is the output data from text inferencing service. This topic loading expresses how related the new text is to all the trained topics. Each number represents a score between 0 and 1. |
| Distance to all SOM cells | 100<br>100; 0.95772004, 0.9567731, 0.95544285,0.95373785, 0.9515351, 0.9487003, 0.94537616, 0.9421076, 0.93996227, 0.9400253, 0.9422353, 0.94544643, 0.9485575, 0.95100945, 0.9526325, 0.9534306, 0.9534795, 0.95284796, 0.95147765, 0.94915694, 0.94567686, 0.9411898, 0.9366132, 0.93357253, 0.93332547, 0.9354927, 0.9384606, 0.94077456, 0.9417325, 0.9412102, 0.9394629, 0.9371152 (it has 100 by 100 SOM cells, so it has 10,000 values like this.) | This is the output data from the SOM inferencing service for projection as continuous surface. It is the computed cosine similarity between the above topic loading and the topic loadings of all the SOM cells. |

TABLE 3-continued

Input and Output Data for Inferencing Services

| Name | Data | Description |
|---|---|---|
| Closest SOM cell | 100 100; 73 0 | This can be used to render a continuous overlay surface on the base map. This is the output data from SOM inferencing service for projection as point. It is the position of the most similar SOM cell to the above topic loadings. This can be rendered as a point on the base map. |

Mapping and Geoprocessing Services

The mapping services may be implemented in a web-mapping server, which provides two different mapping services, dynamic map service and tiled map service. Although dynamic map service does not have a cache of tiles and performs slower than tiled map service, it can be created on the fly, making it more flexible. Tiled map service has pre-computed cache files stored on the server so it performs faster during retrieval, but it takes more time to prepare and cannot be computed on the fly.

In some embodiments, the tiled map service for a base map is preferred, given the application. In geographic mapping, a base map provides reference to any related elements that can be projected onto it. A user can project houses, schools, or roads onto a base map to see the geographic relations between them. A base map usually does not change and provides basic reference for other elements.

Dynamic map service or web graphic may be used for overlay of map layers and elements. A dynamic map service is created on the fly in the web-mapping server in response to users' input by geo-processing services. Graphics, such as points, are dynamically drawn in the web browser, for example as SVG (scalable vector graphic) elements using ArcGIS Javascript client library. Both of these are more dynamic and can be created on the fly in response to users' requests.

A geo-processing service contains one or more geo-processing tasks. One geo-processing task is a tool executed and managed on a server. Geo-processing services are used in GIS for users to execute geo-processing tasks on the server side, which utilizes the server computing resources and distributes to multiple users at the same time. In this application, in some embodiments, geo-processing service is used to create overlay map layer and generate symbology for it. It uses the output from SOM inferencing service, transforms that output into a two-dimensional geometric data structure, and generates a dynamic map service using that geometric data structure. Then it generates symbology and renders the dynamic map with defined colors, such as shown in FIG. 7 (although shown in black and white scale).

Web User Interface

The user interface (UI) may provide a hub to connect services together for users to use and explore the knowledge domain visually. In some embodiments, the UI consists of two parts, user interaction controls and map content. A user's requests may first be sent to the inferencing services server to compute text inferencing and SOM inferencing to get the inferred SOM output. The user interaction controls provide functionality for a user to select from two types of overlay and input the new text for overlay. It also provides the processing bar for users to view the process. The map content shows a base map and overlay elements. A user can use the default control to pan and zoom in/out on the map content.

With the UI interaction controls, a user can type or paste text into the input box and choose to project that input such that either a discrete of continuous overlay is generated. An individual input may be shown as a point symbol in the map content or an overlay surface (FIGS. 10 and 11). If the user chooses the output as a discrete inference, then it would be used to create graphics in the browser; or if the user requests the output as a continuous inference, then it would be sent to the web mapping server to create overlay map layer.

As provided herein, combination of an existing Java library for topic modeling and a newly developed Java library for SOM training creates the possibility of a seamless processing workflow for the creation of base maps. An embodiment of this disclosure provides an integrated workflow and framework to utilize LDA topic modeling, SOM dimensionality reduction, and web GIS to create interactive knowledge domain visualization from any domain specific large text corpus. The following embodiments are described:

a) Java program modules are generated that can preprocess a text corpus, iteratively create an LDA topic model, and perform SOM training in the same programming environment.

b) GIS-based modules are created that transform the output of the LDA/SOM process into data structures compatible with GIS software, such that the base map can be represented in GIS.

c) Trained model and base map are the content drivers for web mapping and web processing services that provide both interactive online domain mapping and live NLP inference.

Although described specifically throughout the entirety of the instant disclosure, representative embodiments have utility over a wide range of applications, and the above discussion is not intended and should not be construed to be limiting, but is offered as an illustrative discussion of aspects of the disclosure. What has been described and illustrated herein are embodiments of the disclosure along with some of their variations. The terms, descriptions and figures used herein are set forth by way of illustration only and are not meant as limitations. Those skilled in the art will recognize that many variations are possible within the spirit and scope of the disclosure, wherein the disclosure is intended to be defined by the following claims—and their equivalents—in which all terms are mean in their broadest reasonable sense unless otherwise indicated.

What is claimed is:

1. A method of constructing a base map, the method comprising:
   processing data items to create modified data items;
   processing the modified data item to create a topic model usable data format to form a topic model, the topic model comprising a plurality of topics;
   processing the topic model into a self-organizing map (SOM) including a plurality of neurons to form a geometric data structure having a geometric shape that represents each of the neurons from the SOM, wherein each of the neurons includes attribute data including a weight for each of the topics in the topic model;
   calculating a measure of spatial autocorrelation for each of the topics in the topic model;
   identifying at least some of the topics as stop topics based on the measure of spatial autocorrelation;
   removing the stop topics from the modified data items; and
   providing the geometric data structure into a geographic information system (GIS) to form a base map including the neurons represented with the geometric shape,
   wherein the neurons in the base map are clustered into polygons based on the attribute data, and
   wherein the base map is scale dependent such that an appearance of symbolized layers and labels depends on a zoom level of the base map.

2. The method of claim 1, wherein the processing data to create a topic model usable data format comprises:
   receiving a plurality of text documents; and
   selecting a portion from each of the plurality of text documents to create a plurality of modified text documents.

3. The method of claim 2, further comprising:
   converting the modified text documents into the topic model usable data format.

4. The method of claim 3, wherein the topic model usable data format comprises a plurality of individual modified text documents as plain text files or a single plain text file including line-separated text content of a plurality of modified text documents.

5. The method of claim 3, further comprising:
   reformatting the topic model usable data format into an ingestible topic model format.

6. The method of claim 1, wherein the topic model comprises a Latent Dirichlet allocation (LDA) topic model.

7. The method of claim 1, wherein the removing stop topics from the modified data items to form a topic model comprises:
   receiving topic model usable data; and
   identifying a number of topics to use in the topic model.

8. The method of claim 7, further comprising:
   determining a topic model output including a plurality of top words and top phrases for each topic.

9. The method of claim 8, wherein the topic model output further comprises:
   a list of data items each having weighted values for topic model topics; and
   a topic model inferencer configured to provide the weighted values for the topic model topics.

10. The method of claim 8, further comprising: identifying stop topics based on top words and top phrases for the topic model topics.

11. The method of claim 10, further comprising:
    identifying stop phrases and stop terms based on top terms and top phrases of the identified stop topics; and
    removing stop phrases and stop terms from the topic model usable data format to form the topic model.

12. The method of claim 1, wherein removing stop topics from the modified data items to be processed to form a topic model comprises an automated or manual iterative loop.

13. The method of claim 12, wherein the automated iterative loop comprises comparing stop topics to a stored library of stop topics.

14. The method of claim 1, further comprising:
    providing a query text;
    receiving an inference and mapping the inference onto the base map based on the similarity of an inferred query topic vector to SOM neuron topic vectors; and
    storing the query text and the inferred query topic vector.

15. The method of claim 14, wherein the query topic vector is determined as the weighted distribution of topic model topics for the query text.

16. The method of claim 14, further comprising:
    providing a discrete overlay or continuous overlay onto the base map to form an inference layer.

17. The method of claim 16, further comprising:
    storing the inference layer as a new base map.

18. The method of claim 1, wherein the measure of spatial autocorrelation comprises Moran's I measure.

19. The method of claim 1, further comprising:
    labelling each of the clustered polygons with a topic having a largest weight within the neurons included in the corresponding clustered polygon.

20. A computer system for constructing a base map, the computer system comprising:
    a data store configured to store data;
    a computer-readable tangible medium comprising software instructions; and
    a processor configured to access the computer-readable tangible medium to load and execute the software instructions to:
      process data items from the data store to create modified data items;
      process the modified data items into a topic model usable data format to form a topic model, the topic model comprising a plurality of topics;
      process the topic model into a self-organizing map (SOM) including a plurality of neurons to form a geometric data structure having a geometric shape that represents each of the neurons from the SOM, wherein each of the neurons includes attribute data including a weight for each of the topics in the topic model;
      calculate a measure of spatial autocorrelation for each of a plurality of words in the modified data items;
      identify at least some of the words from the modified data items as stop topics based on the measure of spatial autocorrelation;
      remove stop topics from the modified data items; and
      provide the geometric data structure into a geographic information system (GIS) to form a base map including the neurons represented with the geometric shape,
    wherein the neurons in the base map are clustered into polygons based on the attribute data, and
    wherein the base map is scale dependent such that an appearance of symbolized layers and labels depends on a zoom level of the base map.

* * * * *